United States Patent [19]
Foner

[11] 3,830,228
[45] Aug. 20, 1974

[54] BIOPHYSIOLOGICAL INFORMATION PROCESSING DEVICE

[76] Inventor: Max Foner, 312 Stonewall, Memphis, Tenn. 38112

[22] Filed: June 12, 1972

[21] Appl. No.: 262,023

[52] U.S. Cl......... 128/2.06 R, 128/2 D, 128/2.05 R
[51] Int. Cl.............................................. A61b 5/04
[58] Field of Search...... 128/2.05 R, 1.05 P, 2.05 T, 128/2.06 A, 2.06 B, 2.06 F, 2.06 G, 2.06 R, 2.06 V, 2 D

[56] References Cited
UNITED STATES PATENTS

| | | | |
|---|---|---|---|
| 3,374,461 | 3/1968 | Anderholm et al............ | 128/2.06 A |
| 3,524,442 | 8/1970 | Horth............................ | 128/2.06 A |
| 3,548,807 | 12/1970 | Crovella........................ | 128/2.06 R |
| 3,554,187 | 1/1971 | Glassner et al. ............... | 128/2.06 A |
| 3,618,592 | 11/1971 | Stewart......................... | 128/2.06 R |
| 3,675,640 | 7/1972 | Gatts............................. | 128/2.06 R |

FOREIGN PATENTS OR APPLICATIONS

| | | | |
|---|---|---|---|
| 1,202,869 | 8/1970 | Great Britain................. | 128/2.06 A |

*Primary Examiner*—William E. Kamm
*Attorney, Agent, or Firm*—John R. Walker, III

[57] ABSTRACT

A portable biophysiological information processing device which may be used to make electrocardiograms, electroencephalograms, and/or pulmonary studies and the like. The device generally incudes three interconnected major subassemblies, i.e., (1) biophysiological information acquisition equipment, as for example, an electrocardiogram (EKG) telesender; (2) a central processor (CPU), as for example, a computer of four registers; (3) a printer, as for example, a high speed printer which bombards the paper with electron charges that are suitably grouped in various patterns to resemble or depict characters and numbers. The computer is interfaced to readily accept data from the acquisition equipment and to feed diagnostic information, in the form of electrical impulses, to the printer. The entire device is mounted on a small cart to facilitate being moved to the bedside of a patient. The device is extremely rapid in conveying a diagnosis or an intelligent interpretation of the biophysiological informaion being received, as for example, the total administering and processing time of an EKG is less than 2½ minutes.

3 Claims, 2 Drawing Figures 3,830,228

BIOPHYSIOLOGICAL INFORMATION PROCESSING DEVICE

BACKGROUND OF THE INVENTION

1. Field of the Invention

This invention relates to the field of biophysiological information processing devices.

2. Description of the Prior Art

Approximately ten years ago the U.S. Public Health Service began a program in trying to ascertain the possibility of computer diagnosis of electrocardiograms. Over that period of time, they did develop a program which was later made available for private enterprise. However, in order to utilize their certified program, certain disadvantages and/or problems prevail: 1 Data acquisition equipment must be obtained. This equipment ranges from $3,500 to $18,000. Should the lower cost acquisition equipment be used, it must be coupled with a more expensive piece of equipment which costs on the order of $18,000 – $23,000.

2 After the information is acquired, it is either placed directly into a computer or is placed on digital tape which is then computerized. Once the computer analysis is done, the output is either transmitted back over a telephone line to a teletype or is returned by mail. The cost of this particular system is somewhere in the magnitude of $180,000 and may go as high as $300,000. Therefore, the minimum investment to obtain computer generated EKG analyses is over $200,000. Obviously, this outlay of expenditure precludes widespread use of computer-generated EKG analyses.

3 Furthermore, in this system, the electrocardiographic data which is received by the EKG machine while the strip chart paper is running out is transmitted and/or transported to the computer site, processed and then brought back. Even an on/line system which is direct into a computer with return of the data takes somewhere in the order of ten minutes from the initial beginning of the cardiogram. The above system is identified as a telesender system presently marketed by Beckman Instruments, Inc., Clinical Instruments Operations, Fullerton, CAL 92634.

Many heart patients are dying because a prompt answer to cardiograms is not available, i.e., either from the above-described Beckman system or from the conventional strip chart paper machine which must be interpreted by a doctor.

SUMMARY OF THE INVENTION

The concept of the present invention is to provide a system which is completely self-contained on a cart that may easily be moved to the bedside of the patient. The cart would have the data acquisition equipment, the computer or central processor, and high speed readout equipment mounted thereon. In other words, the operator would have immediate response available.

The portable biophysiological information (data) processing device of the present invention may be used to make electrocardiograms, electroencephalograms, and/or pulmonary studies and the like. The device generally includes three interconnected major subassemblies, i.e., (1) biophysiological information acquisition equipment, as for example, an electrocardiogram (EKG) telesender; (2) a central processor (CPU), as for example, a computer of four registers; (3) a printer, as for example, a high speed printer which bombards the paper with electron charges that are suitably grouped in various patterns to resemble or depict characters and numbers. The computer is interfaced to readily accept data from the acquisition equipment and to feed diagnostic information in the form of electrical impulses to the printer. The device is extremely rapid in conveying a diagnosis or an intelligent interpretation of the biophysiological information being received, as for example, the total administering and processing time of an EKG is less than 2½ minutes.

An important feature of the present invention is the implementation of real time on line processing, which means the biophysiological information that is taken in is being immediately received by the computer storage rather than being stored on tape and later run into a computer as like the Beckman telesender system above-described. The advantages of this real time on line processing are quite significant since there is an immediate feedback for a back and forth talk situation. In other words, the operator is being provided with a readout as the administering of the EKG is in process. Therefore, any bad information being fed the computer can be immediately corrected, as for example, as the operator is running a standard lead and it is not going into the computer properly, the computer immediately writes back a message on the printer which says, "The standard has not been accepted. It was off-range." Therefore, the operator, while running the EKG, can correct the information, or, if desirable, he can continue to another lead. But at least notice is given that the information is unacceptable or there is a problem for other reasons. Conversely, with the Beckman telesender system, the entire EKG is transmitted over telephone lines to a central receiving center where the EKG is processed. Approximately 1 to 2 hours later the operator gets an answer, and in the event the bad data was being obtained, the EKG must be repeated. Obviously, this disadvantage is obviated by the device of the present invention.

Additionally, the device of the present invention can interpret multiple inputs simultaneously, for example, a pulmonary study and an EKG or analyze an EKG and print it out simultaneously. Further, when the biophysiological information is received by the device of the present invention, the computer stores it; therefore, an option is provided the medical practitioner of merely pressing a button to obtain a printout or a wave shape in a magnified form of the actual true representation of the EKG. In contrast to this, it is not possible to achieve this actual true representation on the typical EKG machine having the strip chart because of the well known dampening effect necessary to achieve suitable mechanical motion of the stylus.

Finally, the device of the present invention will be far less expensive than the prior system described above.

DESCRIPTION OF THE PREFERRED EMBODIMENT

Figure 1:
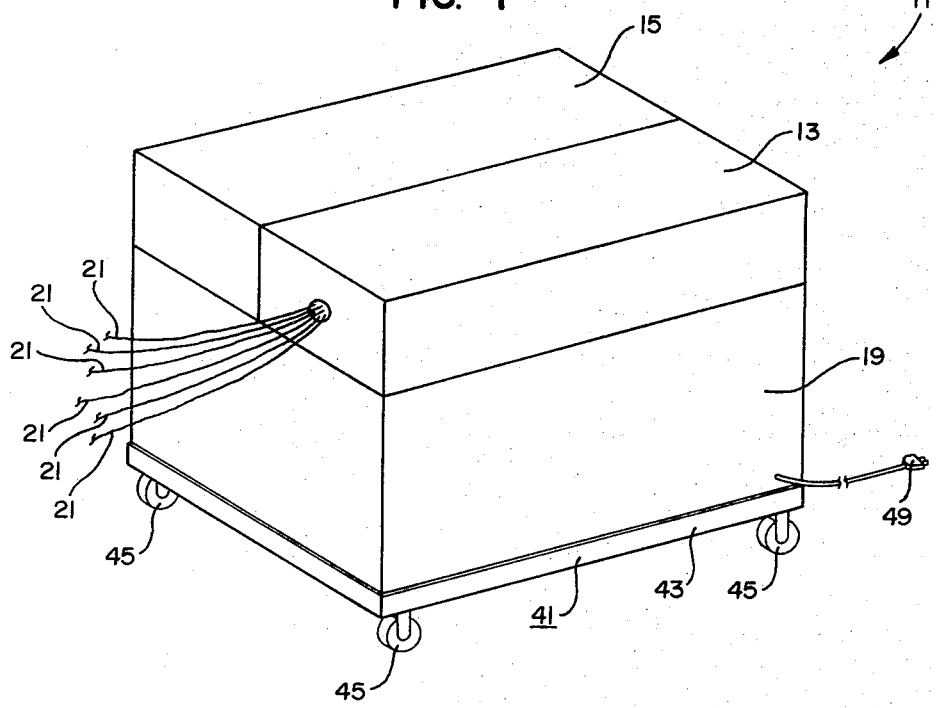
FIG. 1 is a perspective view of the biophysiological information processing device of the present invention.
Figure 2:
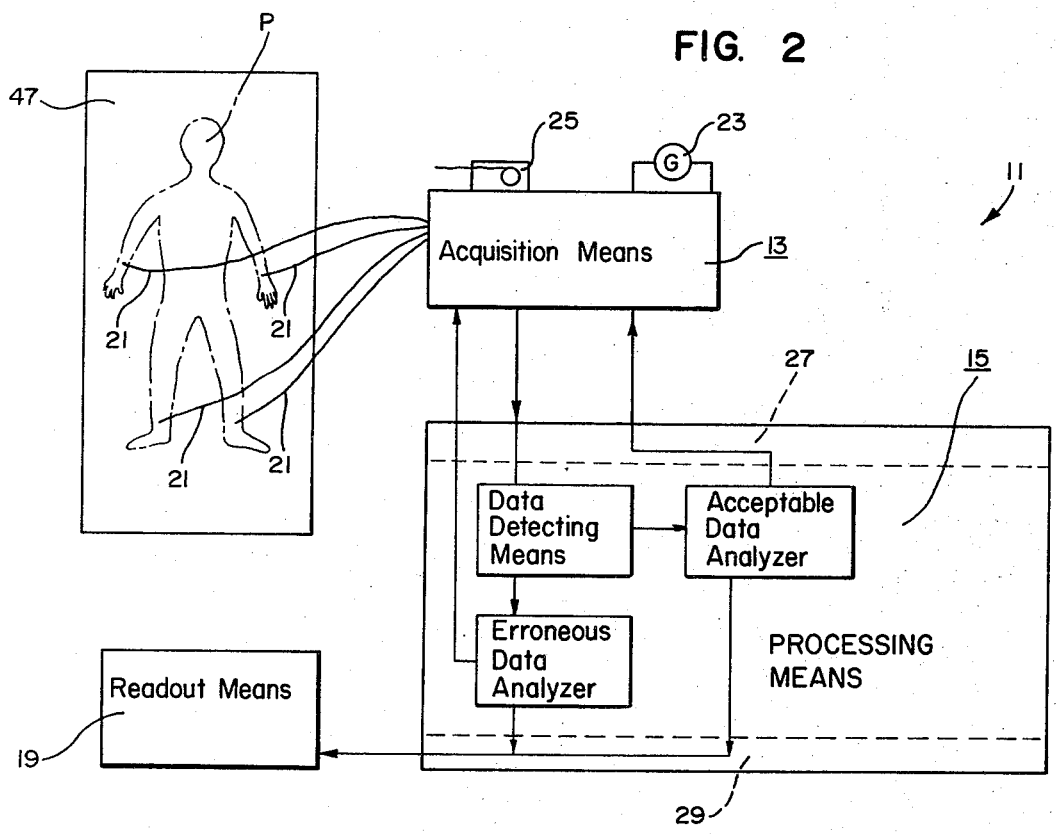
FIG. 2 is a block diagram of the device of the present invention depicted in a typical environment such as the bedside of a patient.

The biophysiological information processing device 11 of the present invention as herein disclosed will be directed toward electrocardiograms (EKG's) for the purpose of conveying the principle of operation and the structure thereof. However, the device 11 is not to be so limited since it may be used with other parameters such as pulmonary studies, electroencephalograms, history taking, eye screening, hearing screening, etc. The device 11 generally includes acquisition means 13 for acquiring the biophysiological information and for converting this information into input eleectrical signals, processing means 15 responsive to the input electrical signals for processing this information, the processing means 15 including means for deducing an intelligent interpretation of this information, and readout means 19 coupled to the processing means 15 for conveying the interpretation of this information.

An example of the acquisition means 13 is marketed by Beckman Instruments, Inc., Fullerton, CAL 92634. In other words, the acquisition means 13 may consist of a Beckman telesender Series TSD-1000 which is specifically constructed so as to be attached to a patient P by a plurality of leads 21 for acquiring electrical activity of the patient's heart in a manner obvious to those skilled in the art. It should be undertood that twelve leads 21 usually are standard for the purpose described. Therefore, it should be understood that the device 11 is not limited to the few leads 21 depicted in the drawings. In this regard, the acquisition means 13, as herein disclosed, preferably is the well known galvanometer type which includes a galvanometer 23 that is responsive to biopotentials resulting from electrical activity of certain organs of the human body, e.g., the heart, whereby analog data is compiled therewith which directly correlates to these biopotentials in a manner yet to be described. Additionally, the acquisition means 13 preferably includes structure for scribing a tracing from the galvanometer 23 onto a strip chart recorder 25 having visual and hard copy information referred to in the art as an EKG tracing.

The processing means 15 preferably is a computer or central processor of four registers such as that manufactured by the Data General Corporation, Southboro, MASS 01772, and having a nomenclature of Nova 1200. The processing means 15 includes an input interface data register 27 and an interface data register 29. The interface 27, as herein disclosed, is manufactured by the Data General Corporation by the tradename Data General 4040, and the interface 29 is manufactured by the Data General Corporation by the tradename Data General 4041. It will be understood that the "Data General 4040" and the "Data General 4041" are basic interfaces which have been considerably modified to adapt them to the particular functions desired in the present apparatus. Thus, the "Data General 4040" has been modified in a manner well known to those skilled in the art to provide the input interface 27, which converts the analog data bits and data from the acquisition means 13 to an acceptable digital form suitable for the computer (e.g., Nova 1200). Also, the "Data General 4041" has been modified in a manner well known to those skilled in the art to provide the output interface 29, which converts binary to alpha numerics suitable for the readout means (e.g., Repco 120 printer).

Processing means 15 is suitably pre-programmed and interfaced so that included in processing means 15 is the following: Deducing means for deducing an intelligent interpretation of the information from the acquisition means 13 including means for screening the information to instantly detect erroneous input information from acquisition means 13, and if not acceptable immediately causing this fact to be indicated on the readout means 19, or, if it is not acceptable, analyzing this information and storing it in the memory banks of the processing means for readout at the proper time. Also, processing means 15 includes means for controlling acquisition means 13 whereby acquisition means 13 may automatically be interrupted when the information being received from the acquisition means is not being comprehended by the processing means.

The readout means 19 preferably is a high speed solid state printer utilizing state of the art electronics and integrated circuits. An example of such a printer is the Repco 120 printer presently marked by Repco, Inc., 1940 Lockwood Way, Post Office Box 7065, Orlando, FLA 32804. More specifically, the printer 19 does not actually print as does a typewriter or a teletypewriter, but instead bombards the paper with electron charges, thereby achieving exceptionally high speed, e.g., the Repco printer writes up to 120 characters per second synchronously.

From FIG. 1 of the drawings, it may be seen that the device 11 is totally contained on a cart 41 having a chassis 43 rollably supported by a plurality of wheels 45 whereby the cart 41 may manually be moved about from one location to another, as for example, to a bed 47, for purposes of acquiring certain biophysiological information resulting from electrical activity of certain organs of the patient P in a manner previously described.

The acquisition means 13, processing means 15, and readout means 19 are suitably arranged on the cart 41 and interconnected whereby a single power cord 49 may be plugged into any convenient 115 volt AC outlet to provide power for the entire device 11 in a manner obvious to those skilled in the art. The cart 41 may optionally include well known handle structure (not shown) to facilitate movement about from one location to another.

The processing means 15 controls the acquisition means 13 in such a manner that it acquires biophysiological information upon command of the processing means 15. Thus, the strip chart recorder 25 is not continuously operating but instead is caused to operate intermittently by processing means 15. In other words, an advantage of the device 11 is the real time on line feature thereof, which means that the information that is acquired by the acquisition means 13 is taken in immediately into the processing means 15 wherein the means therein for detecting erroneous input electrical signals and the information analyzing means therein are immediately interpreting the biophysiological information. This means that while the operator is administering the EKG, he can optionally run one lead at a time, and if the biophysiological information derived therefrom is not being interpreted by the processing means 15, the processing means immediately causes the printer 19 to be activated which conveys a message to the operator. The message may read "The standard has not been accepted. It was off-range," or words to that effect. Therefore, the operator, while administering the EKG, can correct the situation then and there and repeat that portion that was not comprehended.

It will be appreciated that the elapsed time for the processing means 15 and the readout means 19 to accomplish the above process is approximately a few seconds. Furthermore, the operator may at any time terminate the EKG, i.e., he may run one lead; he may run leads 1, 5, 6; he may run leads 1, 2, 3, 4, 5, 6; or any other combination thereof. In other words, the EKG may be terminated at any point and the processing means 15 will process the information which has been received therein. The biophysiological information is reduced to diagnostic statements and the readout means or printer 19 prints out the entirety of its information in less than a minute's time. Therefore, the total time involved in running an electrocardiogram is less than 3 minutes from beginning to end.

Furthermore, the device 11 is under the influence and controlled by the processing means 15 which takes a desired amount of information that it needs for each lead 21 and requests repeat information where such is defective. The readout means 19 conveys messages back to the operator as to whether there is difficulty with poor contact, noise, interference, ranging error, etc.

Because the device 11 is all inclusive and totally contained on the cart 41, portability and mobility are such that the device 11 can be wheeled into an emergency room and/or patient's room and an electrocardiogram can be done with immediate access of information without the need of any communications, i.e., telephone lines, transportation of tapes, etc., as is necessary with the prior devices like the Beckman.

The device 11 may optionally be used to provide an enlarged graphical depiction on the readout means 19 of the wave shape or curves traced on the electrocardiogram tracing or the EKG strip chart recorder 25. Therefore, the strip chart recorder 25 may be deactivated with the printed output from the readout means 19 pictorially depicting the wave forms normally produced by the strip chart recorder 25. This has certain advantages as many people desire to have the information contained on the strip chart recorder 25 mounted. Therefore, this would automatically place the diagnosis with the curve on the same sheet of paper. Secondly, the wave form produced by the readout means 19 would be more accurate since it would be totally void of any dampening effect normally necessary to suitably swing the stylus of the recorder 25 or suitably swing the needle of the galvanometer 23 or the like.

It should be pointed out that on Oct. 8, 1971, applicant filed a disclosure document, No. 006888, in the U.S. Pat. Office, which is incorporated herein by reference.

Although the invention has been described and illustrated with respect to a preferred embodiment thereof, it is to be understood that it is not to be so limited since changes and modifications may be made therein which are within the full intended scope of the invention.

I claim:

1. A self-contained portable biophysiological information processing device comprising acquisition means for acquiring biophysiological information and for converting said information into input electrical signals including possible erroneous electrical signals, processing means responsive to said input electrical signals for processing said information, said processing means comprising means including program and data storage means to deduce an intelligent interpretation of said information, read out means coupled to said processing means for outputting and conveying a printed interpretation of said information, said processing means including means for instantly detecting said erroneous electrical signals from said acquisition means, data analyzing means for analyzing said input electrical signals including means for analyzing possible causes for said erroneous electrical signals, and means responsive to said data analyzing means for immediately activating said readout means in response to said erroneous electrical signals from said erroneous detecting means when said erroneous signals occur whereby said readout means conveys possible causes for said erroneous electrical signals.

2. The device of claim 1 in which said acquisition means includes means for the interruption thereof and in which said processing means includes means for controlling said acquisition means to interrupt said acquisition means when the information being received from the acquisition means is recognized as not valid for processing by the processing means.

3. A portable biophysiological data processing device comprising a cart having a chassis and having a plurality of wheels rollably supporting said chassis whereby said cart may manually be moved about from one location to another, acquisition means mounted on said chassis and including a plurality of electrical leads extending therefrom and being adapted to be attached to a patient for acquiring certain biophysiological data resulting from electrical activity of certain organs of the patient and for converting said biophysiological data into input electrical signals, processing means mounted on said chassis and being responsive to said input electrical signals for processing said biophysiological data; said processing means including means for screening and for analyzing said biophysiological data to provide screened and analyzed data, means for concluding an intelligent interpretation of said screened and analyzed data, means for instantly detecting erroneous input electrical signals from said acquisition means, means for controlling said acquisition means to interrupt said acquisition means when said erroneous input electrical signals are detected and means responsive to said means for analyzing said input signals including means for analyzing possible causes for said erroneous electrical signals for immediately activating said readout means when responding to erroneous input signals whereby said readout means conveys possible causes for erroneous input signals; and solid state electronic printer means mounted on said chassis and being responsive to said means for concluding an intelligent interpretation of said screened and analyzed data for printing said interpretation in lingual characters and numerals.

* * * * *